(12) United States Patent
Wang et al.

(10) Patent No.: US 10,788,310 B2
(45) Date of Patent: Sep. 29, 2020

(54) METHODS AND APPARATUS FOR PHASE STABILIZED SWEPT-SOURCE OPTICAL COHERENCE TOMOGRAPHY (SS-OCT) INCLUDING RESCALING AND DYNAMIC RANGE ENHANCEMENT

(71) Applicant: Kabushiki Kaisha TOPCON, Tokyo (JP)

(72) Inventors: Zhenguo Wang, Ridgewood, NJ (US); Jongsik Kim, Fort Lee, NJ (US); Jonathan Liu, New York, NY (US); Kinpui Chan, Ridgewood, NJ (US)

(73) Assignee: Kabushiki Kaisha TOPCON, Tokyo (JP)

( * ) Notice: Subject to any disclaimer, the term of this patent is extended or adjusted under 35 U.S.C. 154(b) by 203 days.

(21) Appl. No.: 15/440,713

(22) Filed: Feb. 23, 2017

(65) Prior Publication Data

US 2017/0241763 A1    Aug. 24, 2017

Related U.S. Application Data

(60) Provisional application No. 62/299,461, filed on Feb. 24, 2016, provisional application No. 62/299,484, (Continued)

(51) Int. Cl.
*G01B 9/02* (2006.01)

(52) U.S. Cl.
CPC ..... *G01B 9/02078* (2013.01); *G01B 9/02004* (2013.01); *G01B 9/0207* (2013.01); (Continued)

(58) Field of Classification Search
CPC ............ G01B 9/02078; G01B 9/02004; G01B 9/02091
See application file for complete search history.

(56) References Cited

U.S. PATENT DOCUMENTS 6,728,571 B1 * 4/2004 Barbato ............... A61B 5/0066
                                                                600/407
2004/0239943 A1 * 12/2004 Izatt ................... G01N 21/4795
                                                                356/479
(Continued)

FOREIGN PATENT DOCUMENTS

EP    2 899 494 A1    7/2015

OTHER PUBLICATIONS

Biedermann B R et al., "Real time en fact fourier-domain optical coherence tomography with direct hardware frequency demodulation", Optics Letters, Optical Society of America, vol. 33, No. 21, Nov. 1, 2008, pp. 2556-2558, XP001519571, ISSN: 0146-9592. DOI: 10.1364./OL.33.002556.
(Continued)

*Primary Examiner* — Hwa Andrew Lee
(74) *Attorney, Agent, or Firm* — Pearne & Gordon LLP

(57) ABSTRACT

An optical coherence tomography (OCT) system electrically mixes a signature signal with an OCT signal (e.g., an interferogram) output by a photodetector of the OCT system. The signature signal may be a signal output by a photodetector that detects an optical signal from a fiber Bragg grating. The signature signal may then be time delayed before combination with the OCT signal. A series of interferograms are then aligned according to the signature signal. A rescaling signal may be similarly electrically mixed with the signature and OCT signals.

25 Claims, 13 Drawing Sheets

Related U.S. Application Data filed on Feb. 24, 2016, provisional application No. 62/299,397, filed on Feb. 24, 2016.

(52) U.S. Cl.
CPC ..... *G01B 9/02069* (2013.01); *G01B 9/02091* (2013.01); *G01B 2290/60* (2013.01)

(56) References Cited

U.S. PATENT DOCUMENTS

2015/0159991 A1* 6/2015 Hasegawa .......... G01B 9/02083
356/479
2015/0292860 A1 10/2015 Pololeanu et al.

OTHER PUBLICATIONS

European Search Report and Written Opinion for European Patent Application No. 17 15 7983 dated Jul. 3, 2017.

\* cited by examiner

METHODS AND APPARATUS FOR PHASE STABILIZED SWEPT-SOURCE OPTICAL COHERENCE TOMOGRAPHY (SS-OCT) INCLUDING RESCALING AND DYNAMIC RANGE ENHANCEMENT

CROSS REFERENCE TO RELATED APPLICATIONS

This application claims priority to U.S. Provisional Application Ser. No. 62/299,397, filed on Feb. 24, 2016, entitled "METHODS AND APPARATUS FOR PHASE STABILIZED SWEPT-SOURCE OPTICAL COHERENCE TOMOGRAPHY (SS-OCT)"; U.S. Provisional Application Ser. No. 62/299,461, filed on Feb. 24, 2016, entitled "METHODS AND APPARATUS FOR PHASE STABILIZED SWEPT-SOURCE OPTICAL COHERENCE TOMOGRAPHY (SS-OCT) INCLUDING DYNAMIC RANGE ENHANCEMENT"; and U.S. Provisional Application Ser. No. 62/299,484, filed on Feb. 24, 2016, entitled "METHODS AND APPARATUS FOR PHASE STABILIZED SWEPT-SOURCE OPTICAL COHERENCE TOMOGRAPHY (SS-OCT) INCLUDING RESCALING," the entireties of which are incorporated herein by reference.

BACKGROUND

Phase instability is a common problem associated with swept source optical coherence tomography (SS-OCT) systems. The primary causes of swept source OCT phase instability include asynchronization between the light source (e.g., a sweeping laser) in the OCT system and the electrical sweep trigger (for moving a scanner at the beginning of each tuning period of the light source), and trigger uncertainty inherent in the analog-to-digital conversion process. Various approaches have been proposed to address this problem; however, each contains its own problems. Most approaches utilize a k-clock (where k=wavenumber=$2\pi$/wavelength) synchronized to the light source as an analog-to-digital converter clock signal instead of a fixed internal clock.

For example, according to a first approach, a single analog-to-digital channel simultaneously detects and digitizes the OCT signal (herein, OCT signal is meant to generally refer to a detected signal in an OCT system, for example, an interferogram) and an optical signature signal (e.g., as generated by a fiber Bragg grating (FBG)) synchronized with the laser sweeping. Phase-jittering correction is performed by aligning the spectrum (e.g., in k-space) based on the optical signature signal and k-clock information. However, with this approach, there are complications in determining an optimal FBG specification for each OCT application, including the central wavelength, reflectivity (amplitude of the signature signal), and pulse width. This is, in part, because the FBG signal causes saturation and degrades OCT imaging performance. Furthermore, if there is a large unit to unit variation for a swept source laser, more than one group of FBGs may be necessary to accommodate such variation for optimal performance. This can be a burden for mass production.

Similarly, a second approach uses a single analog-to-digital channel to digitize an OCT signal while the analog-to-digital process is initiated by a trigger signal (e.g., generated with an FBG or optical filter) that is synchronized with the laser sweeping. This trigger signal is detected separately from the OCT signal by an optical detector, and is used to initiate the digitization of the OCT signal based on a k-clock. While this approach addresses the asynchronization between the light source (e.g., a sweeping laser) in the OCT system and the electrical sweep trigger, it does not address the uncertainty inherent in the analog-to-digital conversion process, and therefore it still fails to address phase jittering caused by that uncertainty.

In a third approach, the analog-to-digital converter has at least two input channels to digitize OCT signals and FBG signals in parallel. That is, for example, the OCT signal and the optical signature signal are detected and digitized by two separate channels on the same data acquisition unit using the same k-clock. Phase-jittering correction is performed by aligning the OCT spectrum (e.g., in channel 1) based on the optical signature signal (e.g., channel 2). However, due to the additional hardware requirements, the system cost is generally increased with such an approach. Furthermore, there is twice as much data acquired (in a two channel system), which increases required computational power and time. Still, it is possible that even with two channels the signals are not perfectly synchronized and additional phase jittering remains. This is because the two channels may not be synchronized during the analog-to-digital conversion (e.g., due to a design of the data acquisition unit or analog-to-digital converter).

BRIEF SUMMARY

According to a first example described herein, an optical coherence tomography (OCT) system, comprises: a detector that outputs an electrical OCT signal; an analog-to-digital converter; and an electrical signal mixer, wherein the electrical signal mixer receives a first electrical signal at a first input and the electrical OCT signal from the detector at a second input, and outputs an output signal to the analog-to-digital converter, wherein the output signal is an electrically mixed combination of both the first electrical signal and the electrical OCT signal.

In various embodiments of the first example, the first electrical signal is an electrical signature signal generated by a second detector that detects an optical signal; the second detector detects the optical signal from a fiber Bragg grating, such that the first electrical signal is based on the optical signal from the fiber Bragg grating; the first electrical signal carries synchronization information of a light source sweeping of the OCT system; the electrical signal mixer comprises a time delay line operatively connected to at least one of the first input and the second input, such that at least one of the first electrical signal and the electrical OCT signal is time delayed before being mixed; the time delay line adjusts an amount of delay and pulse width of the first electrical signal; the time delay is dynamically adjustable for each A-scan; the electrical signal mixer further comprises a filter operatively connected to at least one of the first input and the second input, such that at least one of the first electrical signal and the electrical OCT signal is filtered before being mixed; the electrical signal mixer further comprises an amplifier operatively connected to at least one of the first input and the second input, such that at least one of the first electrical signal and the electrical OCT signal is amplified before being mixed; a pulse width of the first electrical signal is correlated to a k-clock of the OCT system, or a clock of the analog-to-digital converter; the first electrical signal is a rescaling signal generated based on an interference signal that comprises information of light source sweeping non-linearity of the OCT system; the interference signal is generated from two mirrors, two surfaces of a glass plate, or a Mach-Zehnder interferometer; the OCT system does not utilize a k-clock; the electrical signal mixer further receives a second electrical signal at a third input; the output signal is an electrically mixed combination of the first electrical signal, the second electrical signal, and the electrical OCT signal; and/or the first electrical signal is a signature signal and the second electrical signal is a rescaling signal.

According to a second example herein, a method of imaging with an optical coherence tomography (OCT) system, comprises: generating a first electrical signal; generating an electrical OCT signal by a detector; electrically mixing the first electrical signal and the electrical OCT signal with an electrical signal mixer; and generating an output signal comprising the electrically mixed first electrical signal and the electrical OCT signal, wherein the electrical signal mixer receives the first electrical signal at a first input and the electrical OCT signal from the detector at a second input, and outputs the output signal to an analog-to-digital converter.

In various embodiments of the second example, the first electrical signal is a signature signal generated by a detector that detects an optical signal; the detector detects the optical signal from a fiber Bragg grating, such that the first electrical signal is based on the optical signal from the fiber Bragg grating; the first electrical signal carries synchronization information of a light source sweeping of the OCT system; the method further comprises introducing a time delay in at least one of the first electrical signal and the electrical OCT signal prior to mixing; the method further comprises introducing a time delay and adjusting a pulse width of the first electrical signal; the time delay is dynamically adjustable for each A-scan; the method further comprises filtering at least one of the first electrical signal and the electrical OCT signal prior to mixing; the method further comprises amplifying at least one of the first electrical signal and the electrical OCT signal prior to mixing; a pulse width of the first electrical signal is correlated to a k-clock of the OCT system, or a clock of the analog-to-digital converter; the first electrical signal is a rescaling signal generated based on an interference signal that comprises information of light source sweeping non-linearity of the OCT system; the interference signal is generated from two mirrors, two surfaces of a glass plate, or a Mach-Zehnder interferometer; the method further comprises: generating a second electrical signal; and electrically mixing the first electrical signal, the second electrical signal, and the electrical OCT signal with the electrical signal mixer, wherein the generated output signal comprises the electrically mixed first electrical signal, the second electrical signal, and the electrical OCT signal, and wherein the first electrical signal is a signature signal and the second electrical signal is a rescaling signal; the method further comprises adjusting a dynamic range of the OCT system by passive electrical attenuation of the output signal or the electrical OCT signal prior to analog-to-digital conversion; the passive electrical attenuation is achieved with passive electrical attenuators or optimization of a gain of the detector; and/or the optimization of the gain of the detector is based on a noise analysis of the OCT system.

According to a third example, a method of imaging with an optical coherence tomography (OCT) system comprises: generating an electrical OCT signal by a detector; and adjusting a dynamic range of the OCT system by passive electrical attenuation of the electrical OCT signal prior to an analog-to-digital conversion.

In various embodiments of the third example, the passive electrical attenuation is achieved with passive electrical attenuators or optimization of a gain of the detector; and/or the method further comprises analyzing a noise of the OCT system, wherein the optimization of the gain of the detector is based on the noise analysis.

DETAILED DESCRIPTION

The present disclosure relates to methods and apparatuses capable of addressing the above-described phase-jittering problem in OCT systems, as well as overcoming the above-described limitations of current methods. In brief, an electrical signal mixer is utilized to electrically combine a signature and/or rescaling signal with an OCT signal. By combining electrical embodiments of these signals, rather than optical embodiments, the signals may be independently processed prior to combination. For example, the signals may be amplified, filtered, and may be induced with a user-defined time delay. In this manner, the resulting mixed signal can for example be more easily identified and better used for alignment of A-scans. Moreover, the additional signals (e.g., the signature and rescaling signals) are less prone to introducing noise or otherwise interfering with the OCT signal.

Figure 1:
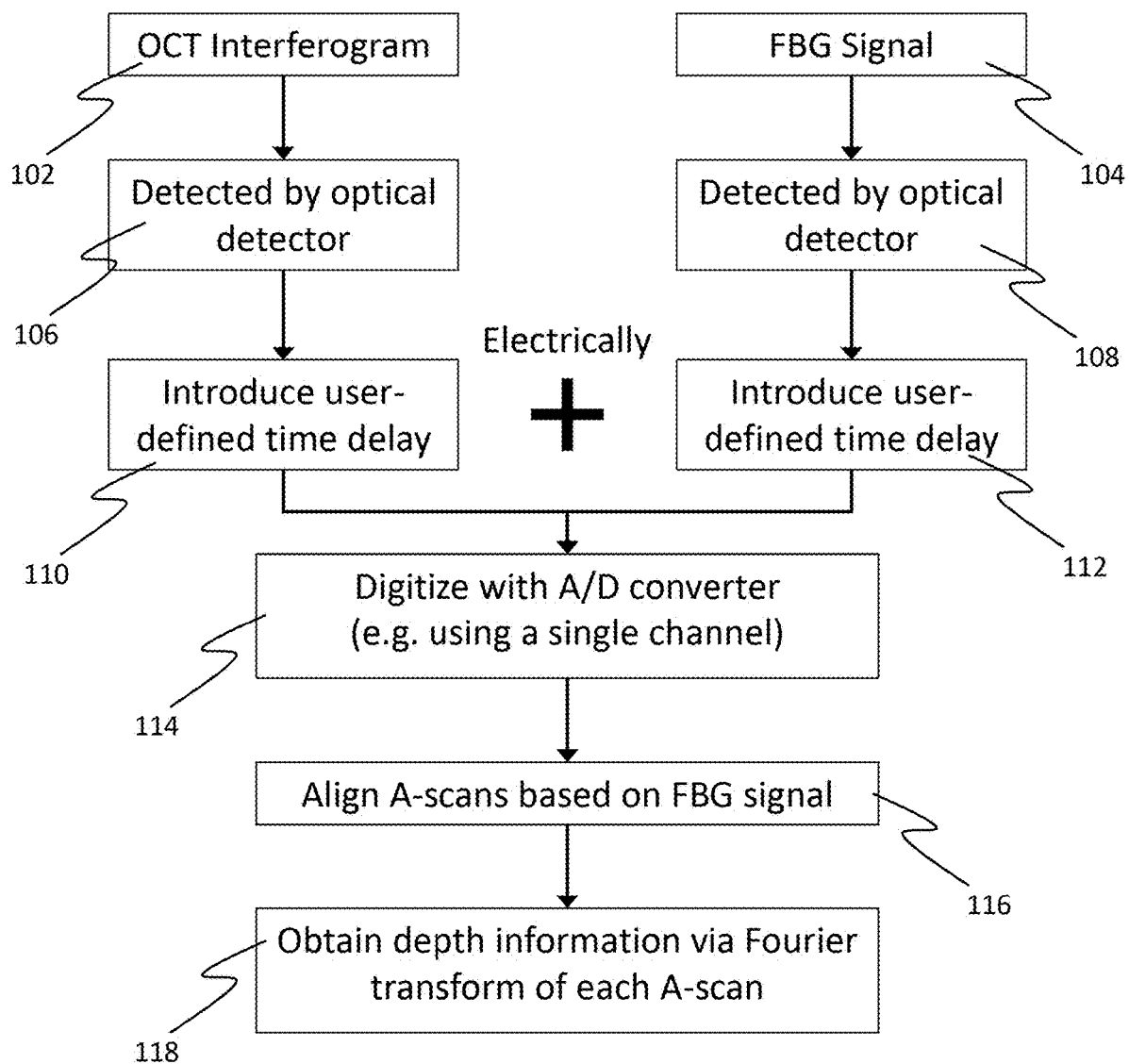
FIG. 1 illustrates a flow chart of an example embodiment for electrically combining OCT and signature signals.

More specifically, phase stabilization is achieved by employing an electrical signal mixer in an OCT system. As illustrated in FIG. 1, An OCT interferogram signal and a signature signal (e.g., from a fiber Bragg grating (FBG)) are detected by optical detectors 106, 108 as understood as part of an OCT system. The electrical signal mixer 100 combines the OCT interferogram 102 and signature signal 104 electronically. Optionally, the OCT interferogram 102 and the signature signal 104 may be independently time delayed 110, 112. For example, in some embodiments, only the signature signal 104 may be time delayed 112.

Figure 2A:
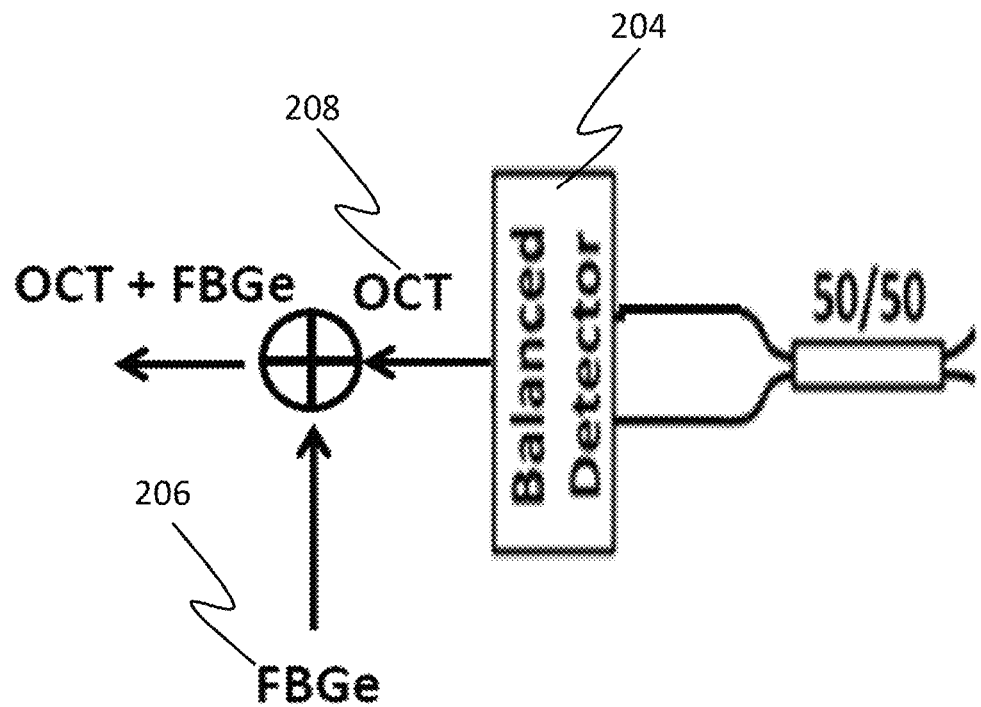
FIGS. 2A and 2B illustrate simplified schematics of the electrical combination described herein.
Figure 2B:
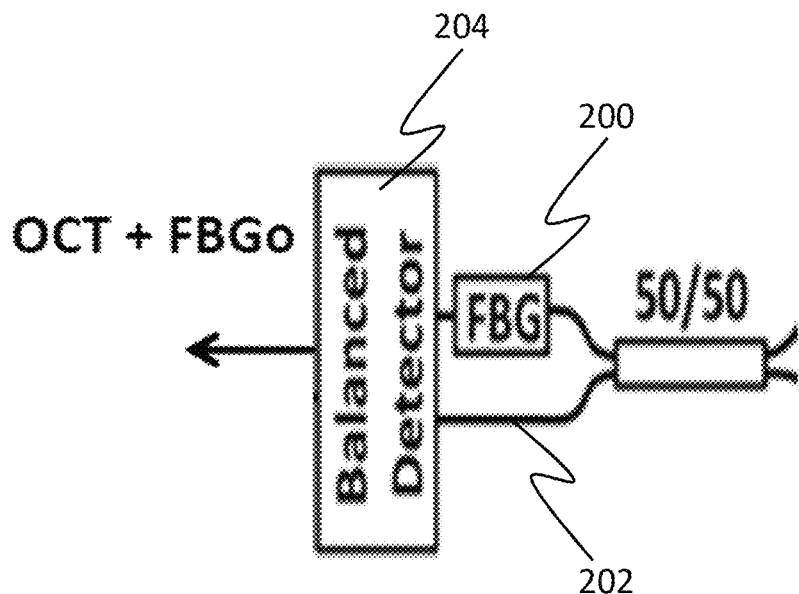

A simplified schematic of this electrical combination is illustrated in FIG. 2A; and a schematic of an optical combination used in other approaches is illustrated in FIG. 2B. In FIG. 2A, the signals are combined after each is detected and converted to an electrical signal, whereas in FIG. 2B, the optical embodiments of the signals are detected by a single photodetector, outputting a single electrical signal therefrom. Here, it is noted that FBGo refers to an optical FBG signal generated by a fiber Bragg grating 200 that is optically combined with an optical OCT signal 202 before a balanced detector 204. FBGe refers to an electrical FBG signal 206 (e.g., output by a photodetector that detects an FBGo signal) that is electrically combined with an electrical OCT signal 208 output after being detected by a photodetector 204.

Referring back to FIG. 1, the resulting signal is then digitized by a single channel analog-to-digital converter 114. OCT phase stabilization may then be achieved by numerically (e.g., in post-processing) aligning a set of axial scans (A-scans) based on an FBG signal in each A-scan 116. Finally, the interferogram can be converted to OCT data having depth information via Fourier transforms of the A-scans 118. In this way, a customized FBG signal may be applied that does not interfere or otherwise alter data within the OCT signal. As such, the FBG signal may be more easily and successfully used for reference when aligning A-scans. Examples of customized FBG signals include the pulse width, amplitude, time delay, and other similar electrical signal features. In some embodiments, the pulse width may be correlated with the k-clock of the OCT system.

While an FBG signal is described herein, it is noted that any signal may be used in the same manner, so long as such signal, or part of such signal carries synchronization information of the light source (e.g. laser) sweeping. And such a signal (or part of such a signal) can be derived from an optical/electrical signal (or part of it) that carries synchronization information of the laser sweeping. Such signals could be, for example, spike pulses, rectangular, sinusoidal, and/or the like, and may occur at any frequency. It is further noted that the above-mentioned numerical aligning of A-scans can be based on any numerical method. For example, peak detection, correlation based algorithms, and/or algorithms customized to work optimally with the customized shape of the signature signal combined and digitized with the OCT signal.

Figure 3:
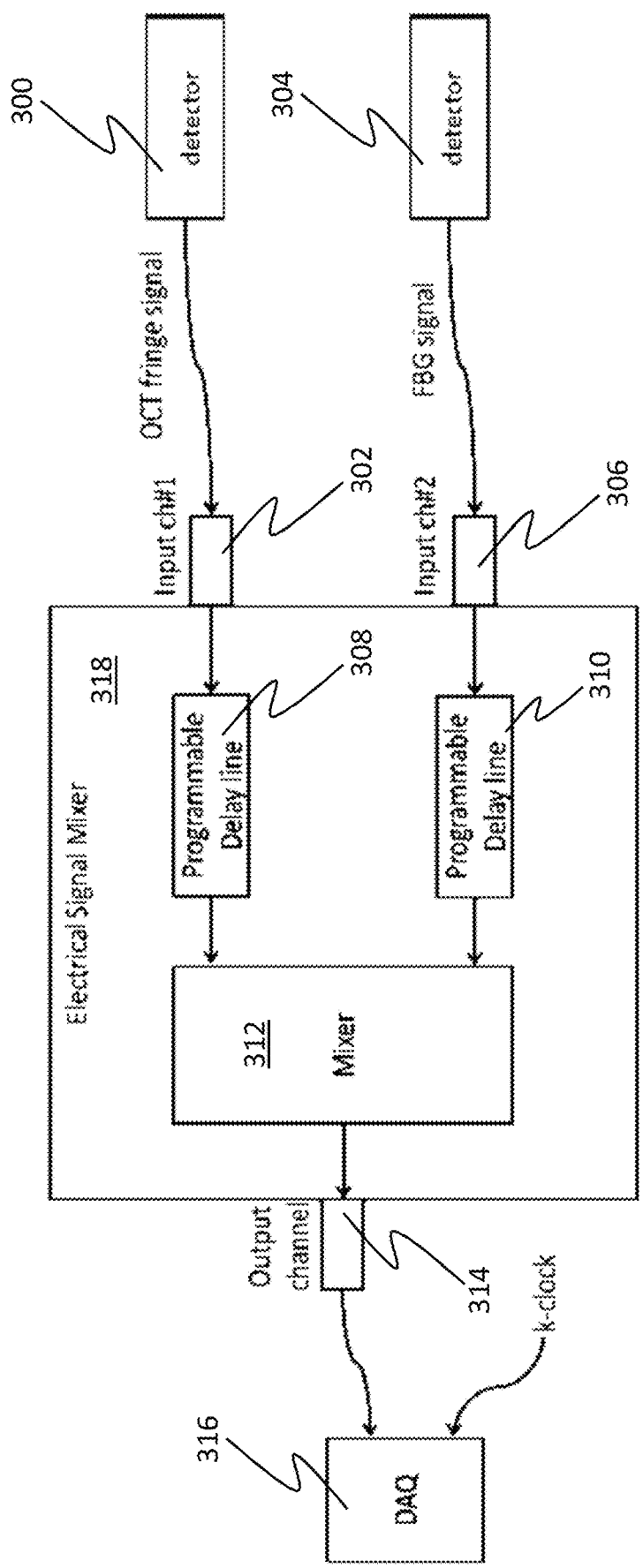
FIG. 3 illustrates a structural schematic for an electrical signal mixer described herein.

A structural schematic for the above-described example is illustrated in FIG. 3. According to this example, an OCT signal is detected by a photodetector 300 and input as an electrical OCT signal to a first input channel 302 of the electrical signal mixer 318. Similarly, an FBG signal detected by another photodetector 304 is input as an electrical signature signal to a second input channel 306 of the electrical signal mixer 318. A programmable time delay line 308, 310 corresponding to each of the first and second input channels 302, 306 introduces a user-defined amount of time delay in the corresponding signal. The two signals are summed by an analog signal mixer 312 and output via an output channel 314. The output signal is then digitized by an analog-to-digital converter in a data acquisition unit 316.

Figure 4:
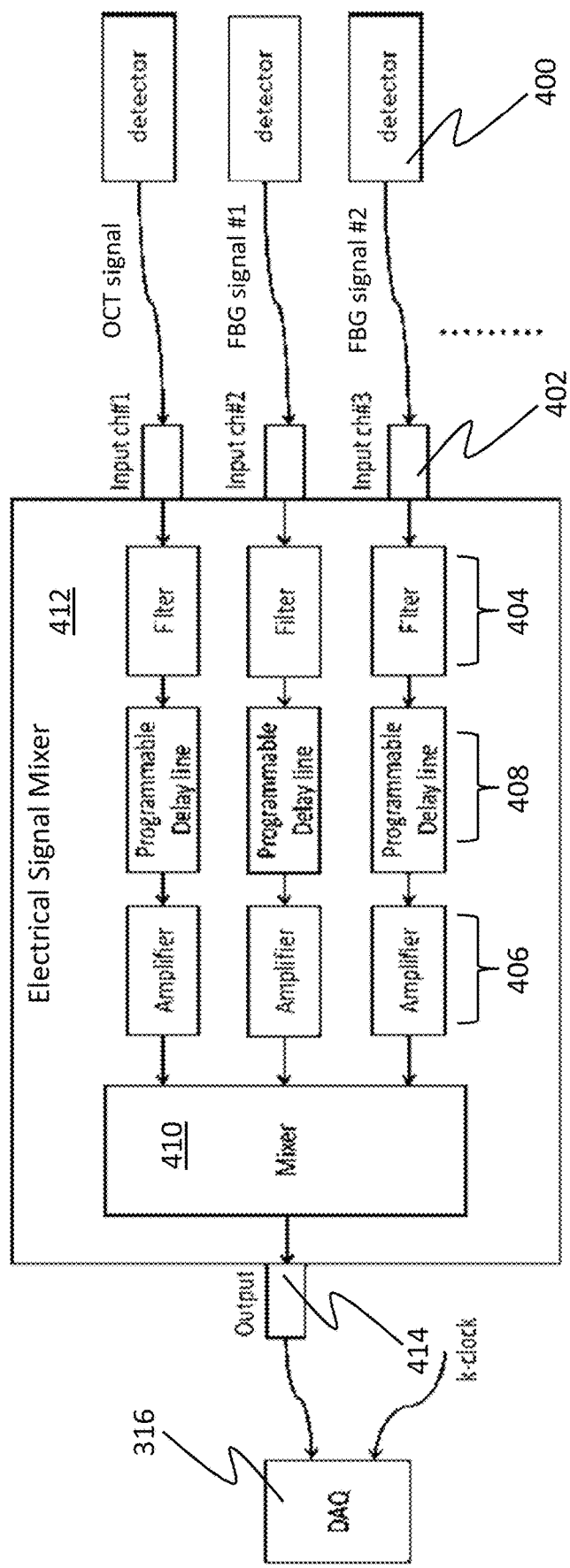
FIG. 4 illustrates another structure schematic for an electrical signal mixer described herein.

A second embodiment is illustrated in FIG. 4. According to this embodiment, the electrical signal mixer 412 comprises more than two input channels, for example by adding an input channel 402 for a second FBG signal detected by a third optical detector 400. The electrical signal mixer 412 may also optionally include filters 404 and/or amplifiers 406 for filtering and/or amplifying the input signals before mixing, in addition to adding the above-noted time delays 408. The filters 404 may be of any type, including low pass, high pass, and band pass. The filters 404 may be analog or digital. Similarly, any amplifier 406 can be used and the amplifier 406 may be analog or digital. It is also noted that the above-noted delay can be optional. The filters 404, delay lines 408, and amplifiers 406 may be the same for each input signal from each input channel, or may be unique for each input signal from each input channel. In other words, the processing of each input signal may be independent.

While the filters 404 and amplifiers 406 are illustrated in FIG. 4 for an electrical signal mixer 412 that has more than two input channels, these features may also be incorporated in an electrical signal mixer 318 having two channels, for example, as shown in the embodiment of FIG. 3. All input signals are then electrically combined at mixer 410, and output from output channel 414 to a data acquisition unit 316 as described above with respect to FIG. 3. In other embodiments, filter, amplifying, and time delay processing may additionally or alternatively occur on the combined output signal output by mixer 312, 310.

Figure 5:
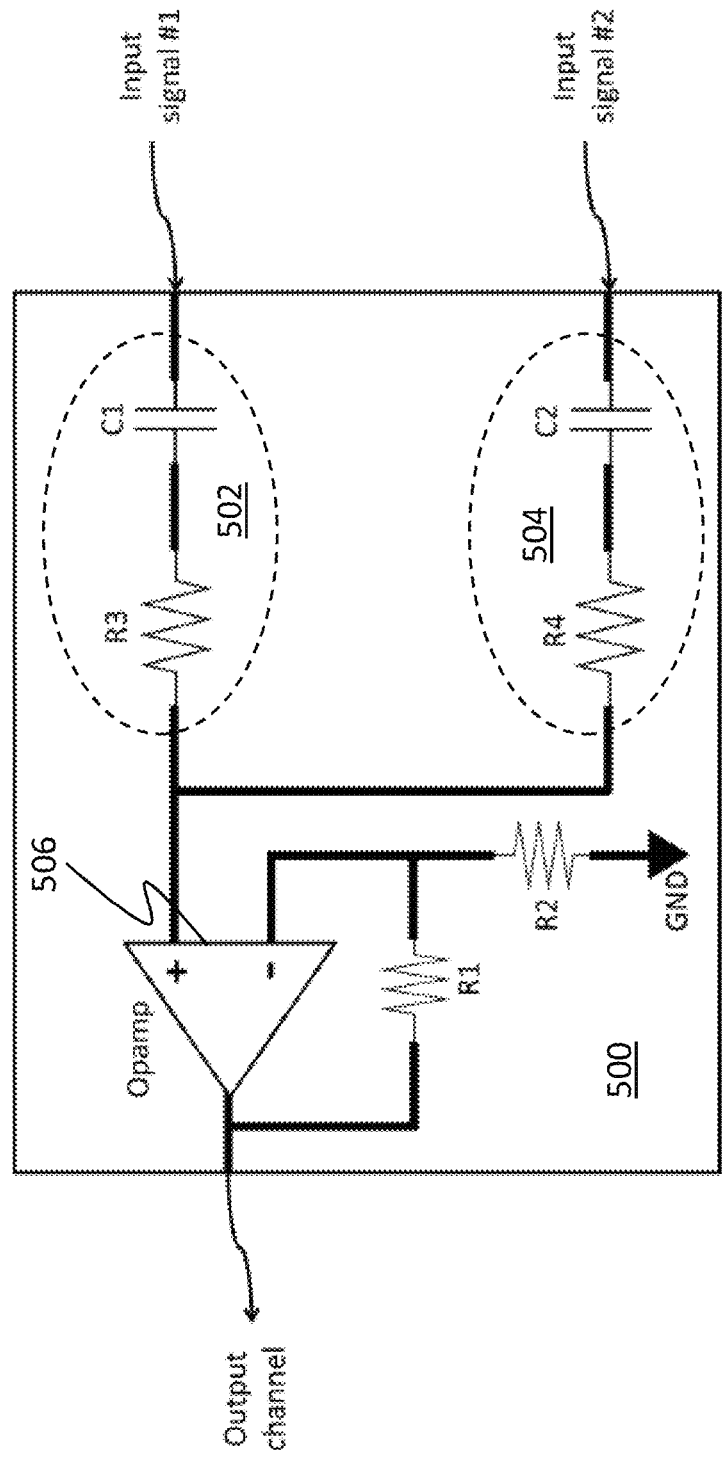
FIG. 5 illustrates an equivalent electrical schematic diagram for a mixer of an electrical signal mixer described herein.
Figure 6:
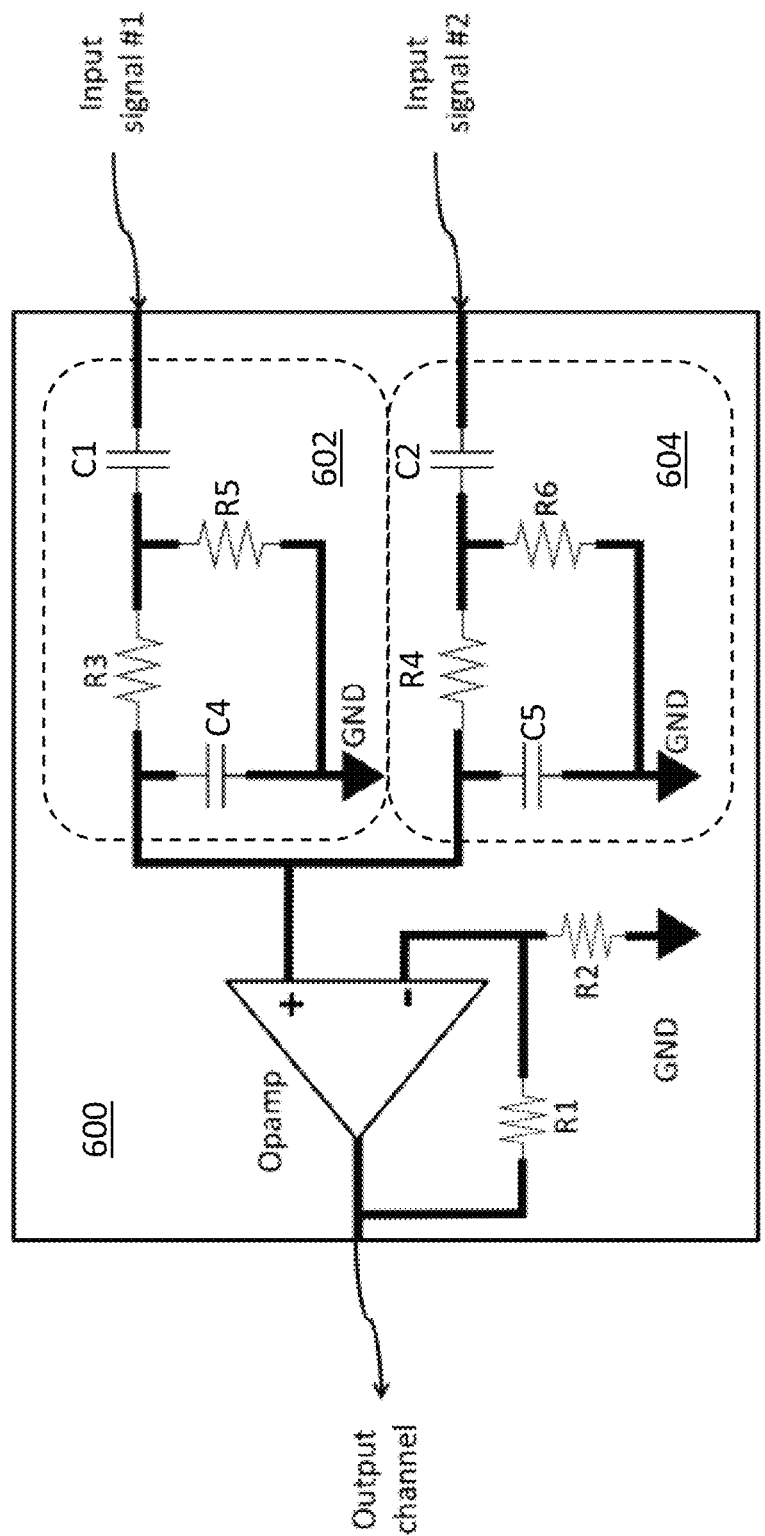
FIG. 6 illustrates another equivalent electrical schematic diagram for a mixer of an electrical signal mixer described herein.

Equivalent electrical schematic diagrams for example embodiments of the mixers 312, 410 in electrical signal mixers 318, 412 are illustrated in FIGS. 5 and 6. It is noted that FIGS. 5 and 6 merely illustrate exemplary schematics and are not limiting. Rather, the features of the mixers illustrated and described herein can be implemented in many variations.

According to the mixer 500 of FIG. 5, RC circuits R3 and C1 (502), and R4 and C2 (504) block DC signals and prevent short circuiting. The RC circuits 502, 504 may also induce a time delay based on a time constant of the RC circuit. The components of the RC circuits 502, 504 may be selected based on value of the resistance and capacitance therein in accordance with a desired time constant, DC level, or the like, and may also be dynamically programmable through the use of variable resistors, variable capacitors, and the like. The RC circuits 502, 504 may be the same, or different depending on the corresponding input signal. The two input signals are then combined at the non-inverting terminal of an operational amplifier 506, and the output signal is output from the operational amplifier 506.

Similarly, according to the mixer 600 of FIG. 6, the additions of C4 and R5 (602), and C5 and R6 (604) additionally filter the input signals, respectively. Of course similar equivalent circuits are envisioned. It is noted that the time delays and filters within mixers 500, 600 are in addition to filters 404, amplifiers 406, and delay lines 308, 310, 408 illustrated in FIGS. 3 and 4.

Figure 7A:
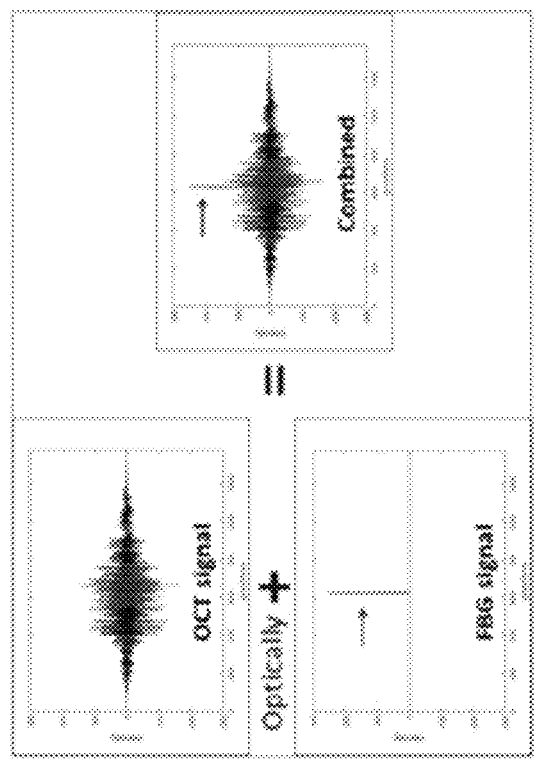
FIGS. 7A and 7B comparatively illustrate optically and electrically combined OCT and signature signals.
Figure 7B:
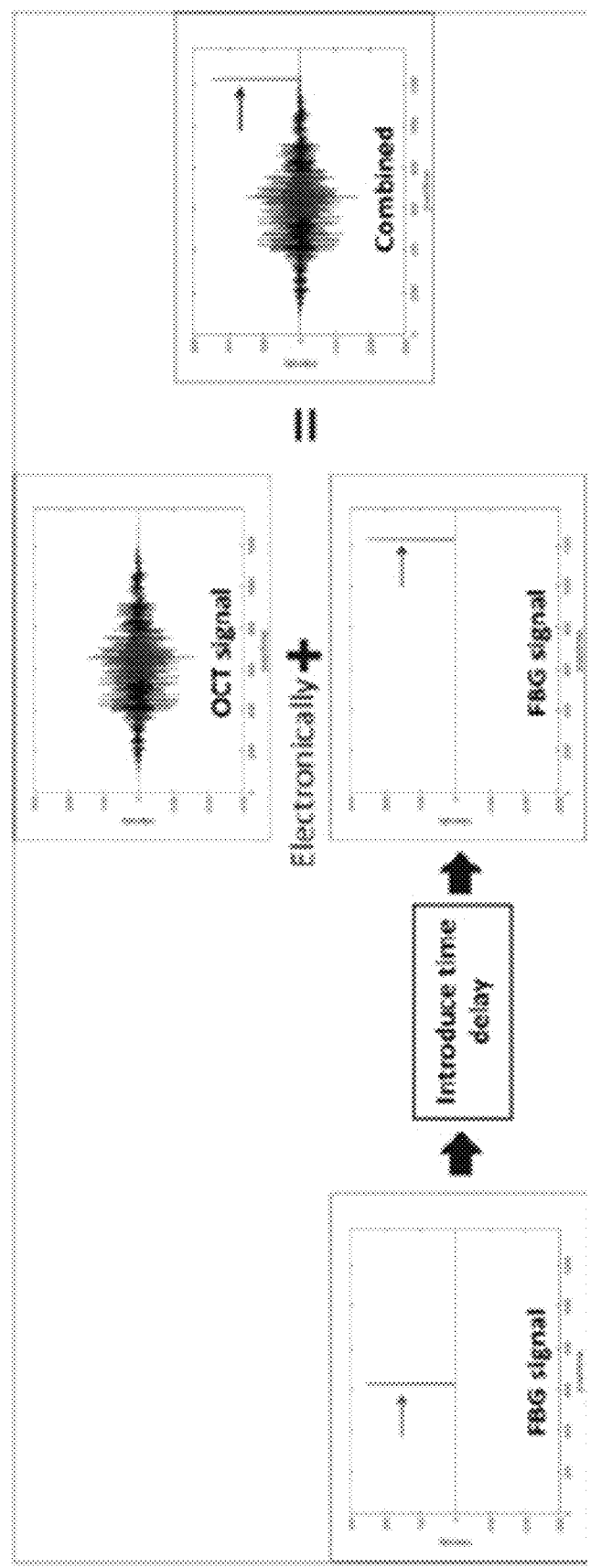

FIGS. 7A and 7B conceptually illustrate the above-described method relative to other approaches utilizing an optical combination of signals. As can be seen in FIG. 7A, when an FBGo signal (indicated by the arrow) is optically combined with an optical OCT signal, the FBG signal may become "lost" in the resulting signal due to sweeping range variation. In other words, the FBGo signal is generated at a time when much of the optical OCT signal is also generated. As such, the FBG signal is not easily identified amongst the OCT signal, and it can be difficult to locate the FBG signal when aligning the A-scans. Moreover, the introduction of the FBGo signal to the optical OCT signal can cause its own artifacts in the resulting signal. As such, image quality may be reduced, even if the artifact is removed or otherwise processed.

In contrast, as illustrated in FIG. 7B, when the FBGe signal (again indicated by an arrow) is time delayed and electronically combined with the electrical OCT signal, the FBGe signal is much more identifiable and does not interfere with the resulting OCT signal. In other words, the FBGe signal can be time delayed so that, when combined with the electrical OCT signal, the FBGe signal is present outside of the majority of OCT signal data. Accordingly, the FBGe signal does not interfere with or otherwise tarnish any detected data. FIG. 7B illustrates the FBGe signal after the OCT signal. In other embodiments, the OCT signal may time delayed such that the FBGe signal occurs prior to the OCT signal.

Figure 8:
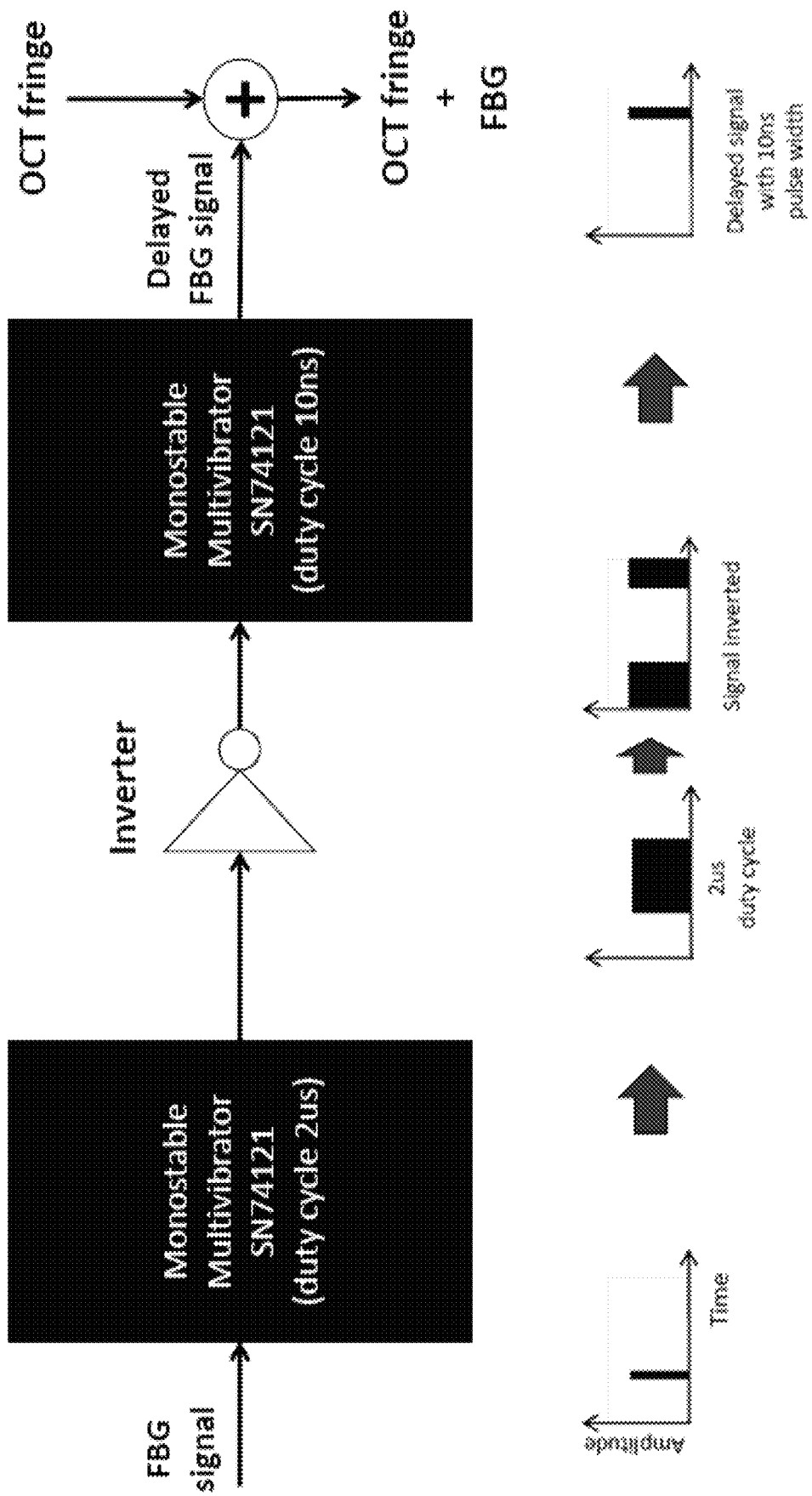
FIG. 8 illustrates an implementation embodiment for inducing a time delay a signal input to the electrical signal mixer.
Figure 9:
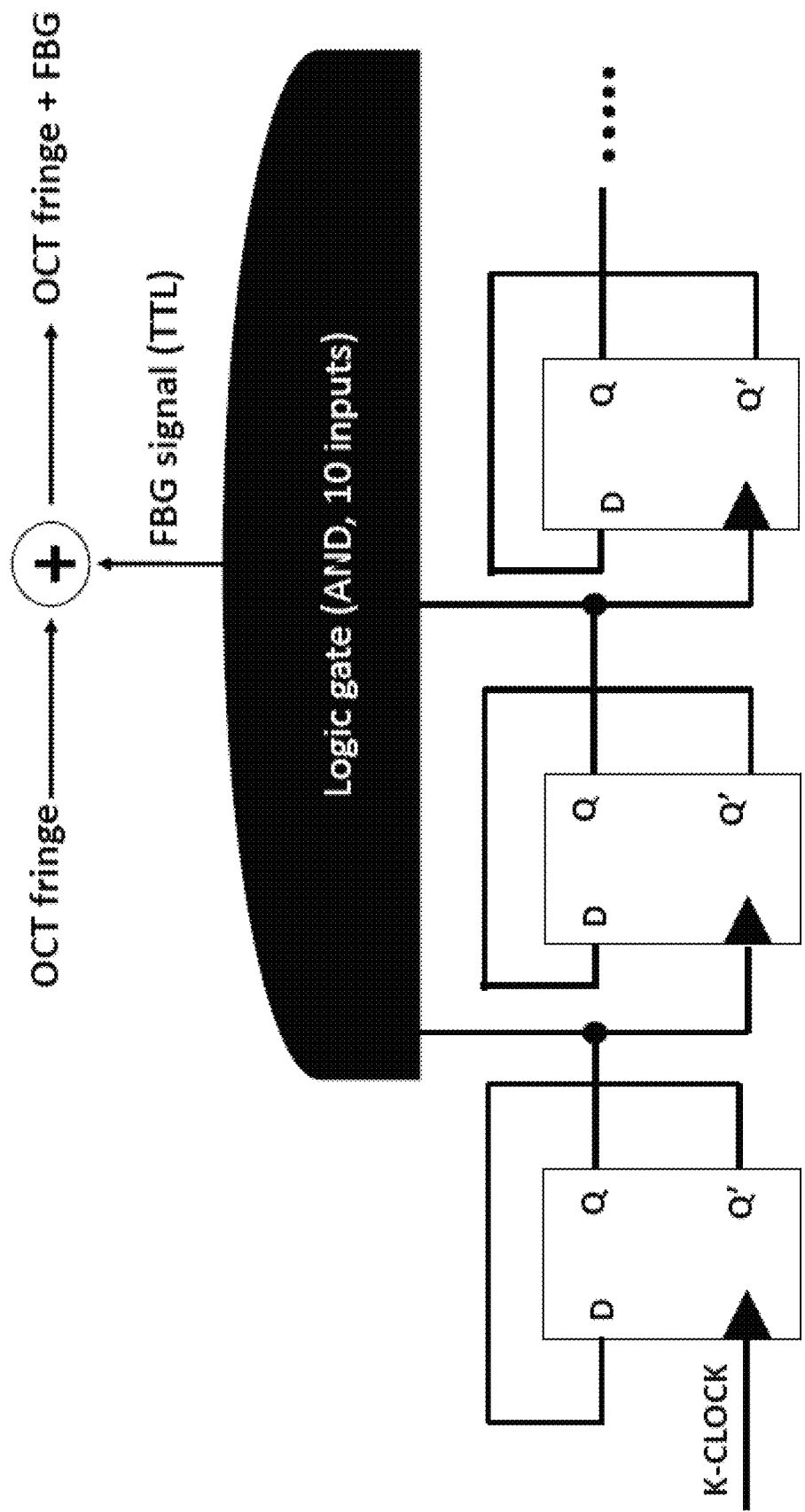
FIG. 9 illustrates another implementation embodiment for inducing a time delay a signal input to the electrical signal mixer.

FIGS. 8 and 9 illustrate example embodiments of a time delay line of an electrical signal mixer for inducing a time delay in a signal (e.g., FBG signal) input to the electrical signal mixer. For example, FIG. 8 illustrates a block diagram of a monostable multivibrator based delay and a corresponding visualization of the signal change at each step. According to the embodiment of FIG. 8, a 2 μs signal is added to the FBGe signal. The signal is then inverted and a 10 ns signal added. This produces a 2 μs delayed FBGe signal having a 10 ns pulse width. By varying the multivibrators used, the delay and pulse width may be adjusted. The pulse width may be correlated to the k-clock or the clock of the analog-to-digital converter. Moreover, it is noted that amount of time delay does not need to be fixed for each A-scan. Rather, the amount of time delay can be dynamically adjusted for each A-scan.

The embodiment of FIG. 9 utilizes a counter based delay with a 10-bit down counter. However, an up counter may also be used. It is further noted that any electronic time delay line may be used, and that such an amount of delay may be user defined and programmable. For example, the amount of delay may be selectable by the components used or may be digitally controlled via a microprocessor. In addition to the above examples, the time delay line may thus be implemented via a simple electric cable, field-programmable gate array (FPGA) based circuit board, digital signal processing based circuit board, or other similar processors and hardware.

Figure 10:
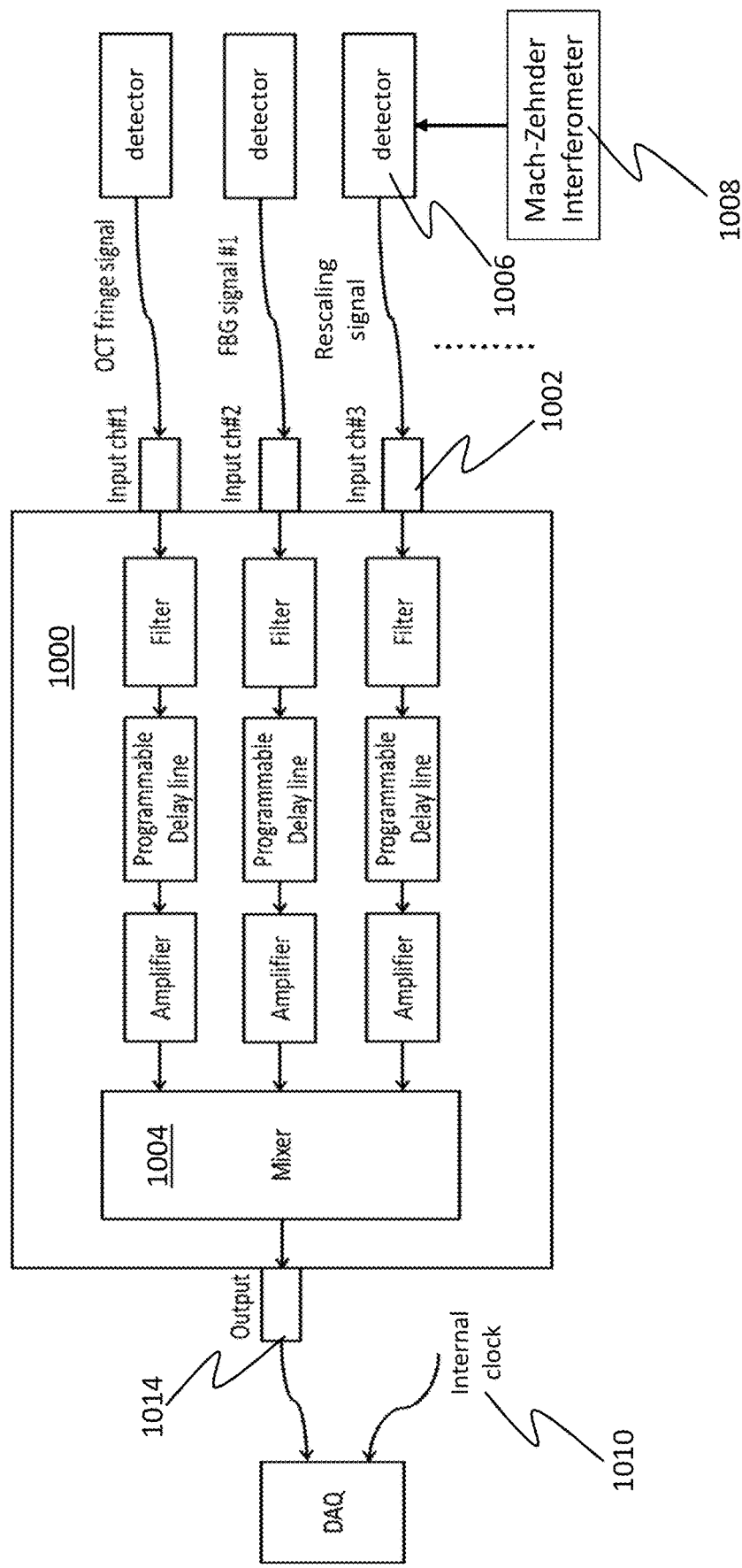
FIG. 10 illustrates another structure schematic for an electrical signal mixer described herein.

As illustrated in FIG. 10, an electrical signal mixer 1000 receives an electrical rescaling signal at an additional input channel 1002. The rescaling signal is output by a detector 1006 that receives an interference signal for rescaling. For example, the interference signal may be generated from a Mach-Zehnder interferometer (MZI) 1008, two mirrors or two surfaces of a glass plate, or similar device, for example, that may determine a relative phase shift. Just as with the FBGe signal and the electrical OCT signal, the rescaling signal may be filtered, amplified, and time delayed as described above. The signal can then be electrically mixed with FBGe and electrical OCT signals input at other channels of the electrical signal mixer 1000 at a mixer 1004 and output from output channel 1014 in the manner described above.

In the embodiment illustrated in FIG. 10, an internal clock 1006 of the analog-to-digital converter, instead of a k-clock, is employed for analog-to-digital conversion/digitization. With such an embodiment, the OCT system can operate without any k-clock. In this manner, an OCT signal is combined with a signal that is cleaner and carries information of the laser sweeping non-linearity, for example, interference signals generated from two mirrors or two surfaces of a glass plate. In doing so, the k-clock may not be used. Without the need for a k-clock, an internal clock of fixed frequency can be employed for digitization. This can lower the system cost and/or facilitate system design flexibility.

Such an interference signal can also be used for rescaling and to suppress the sweeping nonlinearity effect on OCT imaging. It is noted that such a concept could be combined with the phase jittering correction method discussed (e.g., as an additional channel as illustrated in FIG. 10) to facilitate phase jittering correction and/or remove phase ambiguity.

Although not illustrated, the data acquisition unit receiving the output signal from an electrical signal mixer may be further connected to a microprocessor (e.g., a signal processor) for post-processing. For example, the post-processing may include aligning A-scans as noted above, further filtering signals, generating B-scans, C-scans, en-face images, segmenting images, and the like.

According to another aspect described herein, the dynamic range of an OCT system (including both spectrometer based spectral domain OCT and swept source OCT) can be adjusted by passive electrical attenuation prior to analog-to-digital conversion. Such a capability enables optimization of the dynamic range of the imaging system without necessarily compromising sensitivity. Passive electrical attenuation can be achieved with passive electrical attenuators and/or optimization of the gain for a photodetector in the OCT system. Such an optimization can be based on a noise analysis of the system, including the shot noise, relative intensity noise, sensor noise, and analog-to-digital digitization noise. Passive attenuation can be implemented at least up to 15 dB without affecting a signal-to-noise ratio of the signal being attenuated. Such passive attenuation may for example be applicable to OCT imaging in the anterior portion/cornea of the eye. Here, reflection from the cornea apex can be very strong and typically saturate the photodetector and create artifacts. Electrical passive attenuation can mitigate the effects of this reflection without compromising the signal-to-noise ratio.

Herein, passive attenuation may be applied to the electrical OCT signal, for example in the electrical signal mixer by an amplifier 406 prior to mixing with the electrical signature (e.g., FBG) signal. In other embodiments, the passive attenuation may be applied to the combined output signal prior to being acquired by the data acquisition unit. The attenuation may be implemented using discrete electronic components, integrated circuits such as processors, or the like.

Figure 11A:
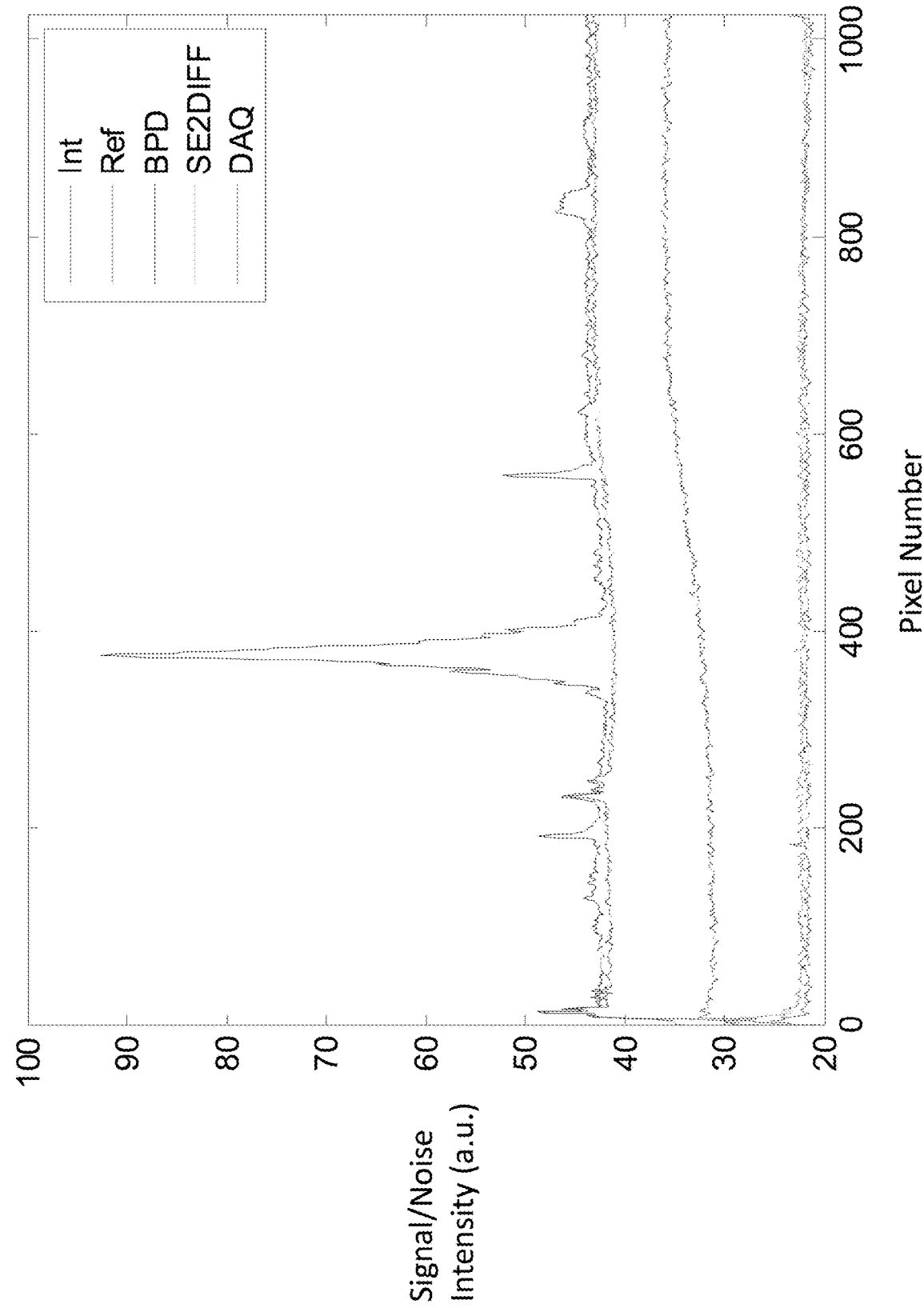
FIGS. 11A and 11B illustrate noise of various signals from an OCT system under 8 dB of passive attenuation (FIG. 11A) and 15 dB of passive attenuation (FIG. 11B).
Figure 11B:
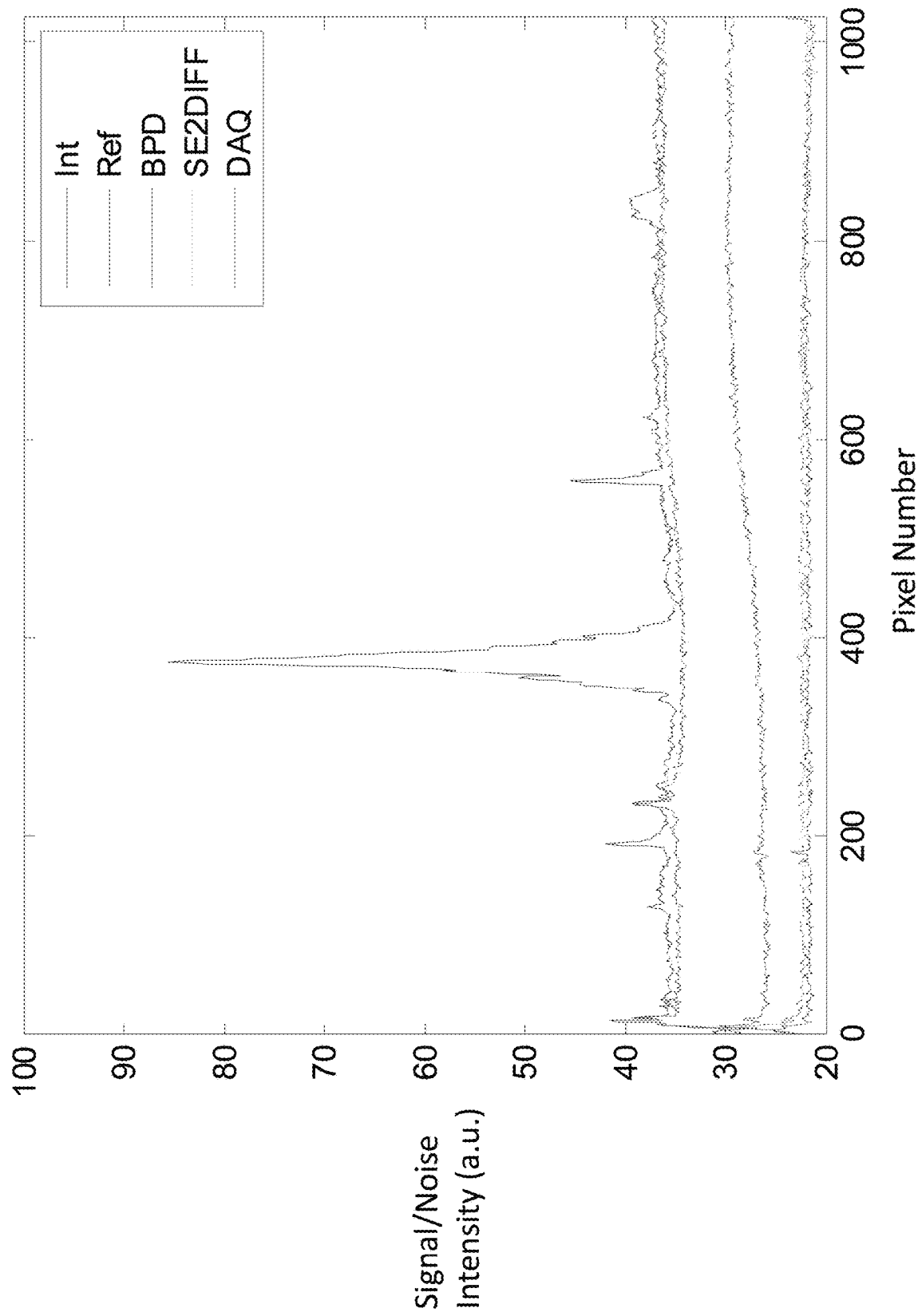

FIGS. 11A and 11B illustrate noise levels of various signals under 8 dB and 15 dB of passive attenuation, respectively. As can be seen in the figure, the X-axis represents pixel numbers for a sample image, and the Y-axis represents the intensity of a signal or noise from an OCT system. The illustrated signals/noise include those from an interference signal (Int), a noise floor of a reference signal only when the signal from the sample is blocked (Ref), a thermal noise floor when there is no light at the balanced photodetector (BPD), a noise floor of a one single-ended-to-differential converter connected to a data acquisition unit (SE2DIFF), and a data acquisition noise floor when there is no input to the data acquisition unit (DAQ). In comparing FIGS. 11A and 11B, it can be seen that the difference between the BPD and DAQ noise floors can be reduced by increasing the attenuation from 8 dB to 15 dB. In other words, passive attenuation as described herein can enhance the dynamic range of an OCT system.

The various embodiments described herein refer to imaging data of an eye obtained from OCT systems. However, the disclosed techniques and processes may equally apply to imaging data obtained using other types of imaging devices, for example ultrasound, and for other imaging data related to objects other than the eye.

It is also to be noted that the above aspects, embodiments, and examples are envisioned to be implemented automatically via hardware and/or software by a processor. A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may be able to execute instructions stored in some form of memory, either volatile or non-volatile, such as random access memories, flash memories, digital hard disks, and the like. The processor may also stand alone or be part of a computer used for operations other than processing image data. It should be noted that the above description is non-limiting, and the examples are but only a few of many possible processors envisioned.

What is claimed is:

1. An optical coherence tomography (OCT) system, comprising:
    a detector configured to output an electrical OCT signal;
    a fiber Bragg grating configured to output an optical signal;
    a second detector configured to detect the optical signal output from the fiber Bragg grating, and to output a first electrical signal based on the detected optical signal;
    an analog-to-digital converter; and
    an electrical signal mixer configured to:
        receive the first electrical signal at a first input and the electrical OCT signal from the detector at a second input,
        electrically mix the first electrical signal and the electrical OCT signal, and
        output an output signal including the electrically mixed combination of both the first electrical signal and the electrical OCT signal to the analog-to-digital converter,
    wherein the first electrical signal carries synchronization information of a light source sweeping of the OCT system.

2. The OCT system of claim 1, wherein the electrical signal mixer comprises a time delay line operatively connected to at least one of the first input and the second input, such that at least one of the first electrical signal and the electrical OCT signal is time delayed before being mixed.

3. The OCT system of claim 2, wherein the time delay line adjusts an amount of delay and pulse width of the first electrical signal.

4. The OCT system of claim 2, wherein the time delay is dynamically adjustable for each A-scan.

5. The OCT system of claim 1, wherein the electrical signal mixer further comprises a filter operatively connected to at least one of the first input and the second input, such that at least one of the first electrical signal and the electrical OCT signal is filtered before being mixed.

6. The OCT system of claim 1, wherein the electrical signal mixer further comprises an amplifier operatively connected to at least one of the first input and the second input, such that at least one of the first electrical signal and the electrical OCT signal is amplified before being mixed.

7. The OCT system of claim 1, wherein the OCT system does not utilize a k-clock.

8. The OCT system of claim 1, wherein:
    the electrical signal mixer further receives a second electrical signal at a third input;
    the output signal is an electrically mixed combination of the first electrical signal, the second electrical signal, and the electrical OCT signal; and
    the first electrical signal is a signature signal and the second electrical signal is a rescaling signal.

9. A method of imaging with an optical coherence tomography (OCT) system, comprising:
    generating a first electrical signal;
    generating an electrical OCT signal by a detector;
    receiving the first electrical signal at a first input of an electrical signal mixer;
    receiving the electrical OCT signal from the detector at a second input of the electrical signal mixer;
    electrically mixing the first electrical signal and the electrical OCT signal with the electrical signal mixer;
    generating an output signal comprising the electrically mixed first electrical signal and the electrical OCT signal; and
    outputting the output signal from the electrical signal mixer to an analog-to-digital converter,
    wherein the first electrical signal carries synchronization information of a light source sweeping of the OCT system, and
    wherein the detector detects the optical signal from a fiber Bragg grating, such that the first electrical signal is based on the optical signal from the fiber Bragg grating.

10. The method of claim 9, wherein the first electrical signal is a signature signal generated by a detector that detects an optical signal.

11. The method of claim 9, further comprising introducing a time delay in at least one of the first electrical signal and the electrical OCT signal prior to mixing.

12. The method of claim 9, further comprising introducing a time delay and adjusting a pulse width of the first electrical signal.

13. The method of claim 12, wherein the time delay is dynamically adjustable for each A-scan.

14. The method of claim 9, further comprising filtering at least one of the first electrical signal and the electrical OCT signal prior to mixing.

15. The method of claim 9, further comprising amplifying at least one of the first electrical signal and the electrical OCT signal prior to mixing.

16. The method of claim 9, wherein a pulse width of the first electrical signal is correlated to a k-clock of the OCT system, or a clock of the analog-to-digital converter.

17. The method of claim 9, wherein the first electrical signal is a rescaling signal generated based on an interference signal that comprises information of light source sweeping non-linearity of the OCT system.

18. The method of claim 17, wherein the interference signal is generated from two mirrors, two surfaces of a glass plate, or a Mach-Zehnder interferometer.

19. The method of claim 9, further comprising:
    generating a second electrical signal; and
    electrically mixing the first electrical signal, the second electrical signal, and the electrical OCT signal with the electrical signal mixer,
    wherein the generated output signal comprises the electrically mixed first electrical signal, the second electrical signal, and the electrical OCT signal, and
    wherein the first electrical signal is a signature signal and the second electrical signal is a rescaling signal.

20. The method of claim 9, further comprising: adjusting a dynamic range of the OCT system by passive electrical attenuation of the output signal or the electrical OCT signal prior to analog-to-digital conversion.

21. The method of claim 20, wherein the passive electrical attenuation is achieved with passive electrical attenuators or optimization of a gain of the detector.

22. The method of claim 21, wherein the optimization of the gain of the detector is based on a noise analysis of the OCT system.

23. An optical coherence tomography (OCT) system, comprising:
    a detector configured to output an electrical OCT signal;

an analog-to-digital converter; and an electrical signal mixer configured to:
- receive a first electrical signal at a first input and the electrical OCT signal from the detector at a second input,
- electrically mix the first electrical signal and the electrical OCT signal, and
- output an output signal including the electrically mixed combination of both the first electrical signal and the electrical OCT signal to the analog-to-digital converter, wherein the first electrical signal carries synchronization information of a light source sweeping of the OCT system, wherein the electrical signal mixer comprises a time delay line operatively connected to at least one of the first input and the second input, such that at least one of the first electrical signal and the electrical OCT signal is time delayed before being mixed.

24. The OCT system of claim 23, wherein the time delay line adjusts an amount of delay and pulse width of the first electrical signal.

25. The OCT system of claim 23, wherein the time delay is dynamically adjustable for each A-scan.

* * * * *